United States Patent
Mushenski

(10) Patent No.: US 9,462,786 B2
(45) Date of Patent: Oct. 11, 2016

(54) ANIMAL BEHAVIORAL CONTROL APPARATUS

(71) Applicant: Canine Innovations, Inc., Mount Clemens, MI (US)

(72) Inventor: Christopher B. Mushenski, Mt. Clemens, MI (US)

(73) Assignee: Canine Innovations, Inc., Mt. Clemens, MI (US)

( * ) Notice: Subject to any disclaimer, the term of this patent is extended or adjusted under 35 U.S.C. 154(b) by 200 days.

(21) Appl. No.: 14/215,634

(22) Filed: Mar. 17, 2014

(65) Prior Publication Data

US 2014/0261232 A1 Sep. 18, 2014

Related U.S. Application Data

(60) Provisional application No. 61/792,608, filed on Mar. 15, 2013.

(51) Int. Cl.
*A01K 15/02* (2006.01)
*A01K 15/00* (2006.01)

(52) U.S. Cl.
CPC .............. *A01K 15/00* (2013.01); *A01K 15/02* (2013.01)

(58) Field of Classification Search
CPC .. A01K 15/02; A01K 15/021; A01K 15/022; A01K 29/00
USPC ........ 119/719, 712, 718, 905; 222/394, 399, 222/402.1, 3, 498, 499, 513, 514, 518, 522, 222/526, 537, 559
See application file for complete search history.

(56) References Cited

U.S. PATENT DOCUMENTS

| | | |
|---|---|---|
| RE24,730 E | 10/1959 | Reeves |
| 3,670,690 A | 6/1972 | Swanson |
| 4,044,712 A | 8/1977 | Goodman et al. |
| 4,166,428 A | 9/1979 | Freeman et al. |
| 4,185,670 A | 1/1980 | Sartell, Jr. |
| 4,227,482 A | 10/1980 | Scheindel |
| 4,627,385 A | 12/1986 | Vinci |
| 4,852,510 A | 8/1989 | Joseph, Jr. et al. |
| 4,893,580 A | 1/1990 | Joseph, Jr. et al. |
| 4,967,684 A | 11/1990 | Vidovic et al. |
| 4,970,983 A | 11/1990 | LeBlanc et al. |
| 5,355,830 A | 10/1994 | deJong |
| 5,501,179 A | 3/1996 | Cory |
| 6,615,770 B2 | 9/2003 | Patterson et al. |
| 6,820,571 B2 | 11/2004 | Cory |
| 7,174,856 B2 | 2/2007 | Neri |
| 8,037,848 B2 | 10/2011 | Mushenski et al. |
| 8,051,806 B2 | 11/2011 | Mushenski et al. |
| 8,302,822 B2 * | 11/2012 | Kranz ............. B67D 1/12 137/505.36 |
| 8,800,824 B2 * | 8/2014 | Ganan-Calvo ......... B65D 83/44 222/145.2 |

* cited by examiner

*Primary Examiner* — Trinh Nguyen
(74) *Attorney, Agent, or Firm* — Reising Ethington, P.C.

(57) ABSTRACT

One embodiment of an animal behavioral control apparatus includes a cartridge and a head. The cartridge contains pressurized gas. The head is coupled to the cartridge and includes a body and an actuator. The body has a first passage that can communicate with the pressurized gas. The body also has a bore. The actuator extends through the bore and has a second passage. When the animal behavioral control apparatus is in a first state, the first passage and the second passage are not in communication with each other. And, upon actuation of the actuator, the animal behavioral control apparatus is brought to a second state in which the first passage and second passage are in communication with each other.

13 Claims, 2 Drawing Sheets

ANIMAL BEHAVIORAL CONTROL APPARATUS

CROSS REFERENCE TO RELATED APPLICATION

This application claims the benefit of U.S. Provisional Patent Application No. 61/792,608 filed Mar. 15, 2013, the entire contents of which are hereby incorporated by reference.

FIELD OF THE DISCLOSURE

The present disclosure relates generally to controlling an animal, and more particularly to using an apparatus to control an animal's behavior.

BACKGROUND OF THE DISCLOSURE

A variety of techniques can be used to control an animal's behavior. For example, dog trainers ordinarily teach dogs by a repetition and reward technique to, among other things, obey commands, compete in shows or races, work in law enforcement, protect property, perform tricks, and guide people who are visually impaired. But sometimes it may be necessary to interrupt undesirable behavior as it is occurring in order to correct it, and sometimes one technique may work on one animal and not work on another animal.

SUMMARY

One embodiment of an animal behavioral control apparatus includes a cartridge and a head. The cartridge contains pressurized gas. The head is coupled to the cartridge. The head includes a body and an actuator. The body has a first passage that can communicate with the pressurized gas in the cartridge. The body has a bore. The actuator extends through the bore in assembly. The actuator has a second passage. When the animal behavioral control apparatus is in a first state, the first passage and the second passage are not in communication with each other and gas does not flow through the second passage. When the actuator is actuated by a user, the animal behavioral control apparatus is brought to a second state in which the first passage and the second passage are in communication with each other and gas flows through the second passage.

BRIEF DESCRIPTION OF THE DRAWINGS

The following detailed description of an embodiment is set forth with reference to the accompanying drawings, in which.

DETAILED DESCRIPTION OF DISCLOSED EMBODIMENTS

Figure 1:
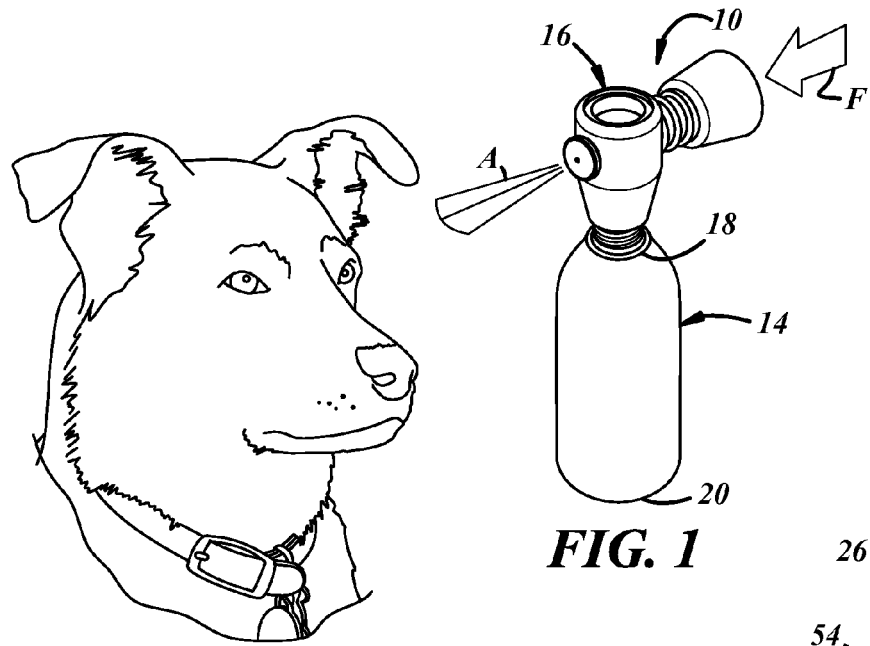
FIG. 1 is a perspective view showing an embodiment of an animal behavioral control apparatus.

Referring in more detail to the drawings, the figures show one embodiment of an animal behavioral control apparatus 10 that can be used to control an animal's behavior, like interrupting a dog's unwanted behavior during training and other activities. When used, the animal behavioral control apparatus 10 ejects a blast of gas that may be objectionable to the dog. Although not all animals may find a particular blast of gas objectionable, the blast may at least distract or be noticed by the animal. Other animals include other household pets like cats, or outdoor animals such as raccoons. And while illustrated by one embodiment in the figures, the animal behavioral control apparatus 10 can have different designs and constructions than shown, some of which are described below.

Referring to the embodiment of FIGS. 1-4, the animal behavioral control apparatus 10 is a compact hand-held device that can eject a blast or shot of gas in a somewhat controlled and directed zone A which, when aimed at a dog, may be disagreeable to the dog and may disrupt whatever the dog is doing at that time. In this embodiment, the animal behavioral control apparatus 10 includes a cartridge 12, a cover 14, and a head 16.

The cartridge 12 can be of different types and can contain different pressurized gases. For example, the cartridge 12 can contain $CO_2$, $N_2$, $O_2$, NO, or another gas. In specific examples, the cartridge 12 can be a twelve gram reservoir, a sixteen gram reservoir, or a reservoir of a different size. And in any of these examples, the cartridge 12 can be threaded. Furthermore, and although not shown in the figures, an o-ring seal can be set between the cartridge 12 and the head 16 in order to facilitate a fitting between the two and form a seal therebetween.

The cover 14 fits around a part or more of the cartridge 12 in order to prevent the user from making direct contact with the cartridge, which may reach reduced temperatures in the midst of expelling pressurized gas. If the temperature of the cartridge 12 is not lowered during its use, however, then the cover 14 may not be necessary and may not be provided. The cover 14 in the figures is in the form of a sleeve with an open top 18 for receiving an upper part of the cartridge 12 and with a closed bottom 20 for enclosing a lower part of the cartridge. The bottom could also be open instead of closed. The cover 14 can be made of a rubber material, a vinyl material, a plastic material, or another material. In assembly in this embodiment, the cover 14 is stretched over the cartridge 12 and is sized for a somewhat close-fit thereover. In other embodiments, the cover could be connected to the head for example, by press-fitting, screwing, or via another way.

The head 16 interacts with and couples to the cartridge 12 and allows a user to incite the animal behavioral control apparatus 10 to eject a blast of gas. The head 16 can have different designs, constructions, functionalities, and components depending upon, among other considerations, the type and size of the cartridge 12 and desired qualities of the ejected blast of gas including its intensity and size. In the embodiment of the figures, the head 16 includes a body 22, a spring 24, and an actuator 26. Still, the head could have more or less components than those shown and described herein.

Figure 2:
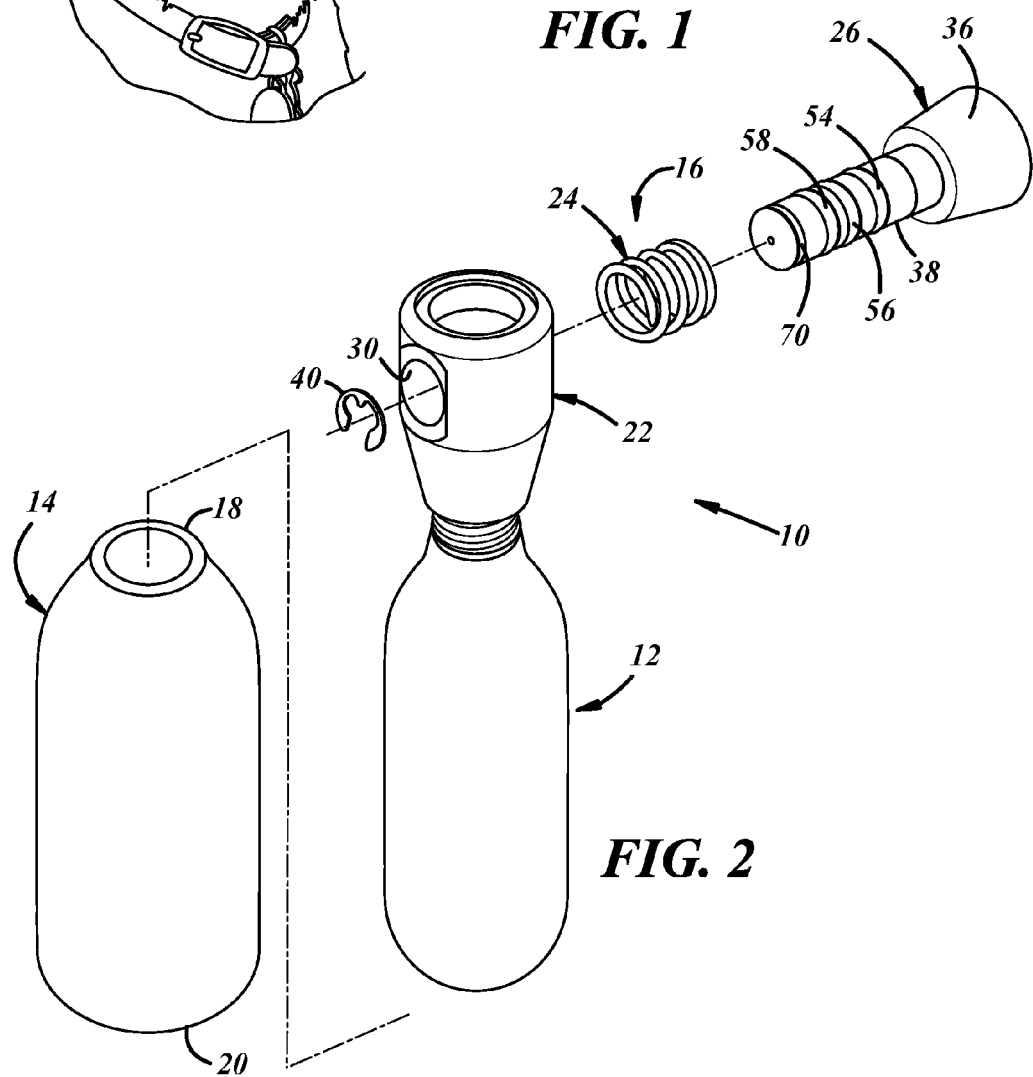
FIG. 2 is an exploded view of the animal behavioral control apparatus of FIG. 1.
Figure 3:
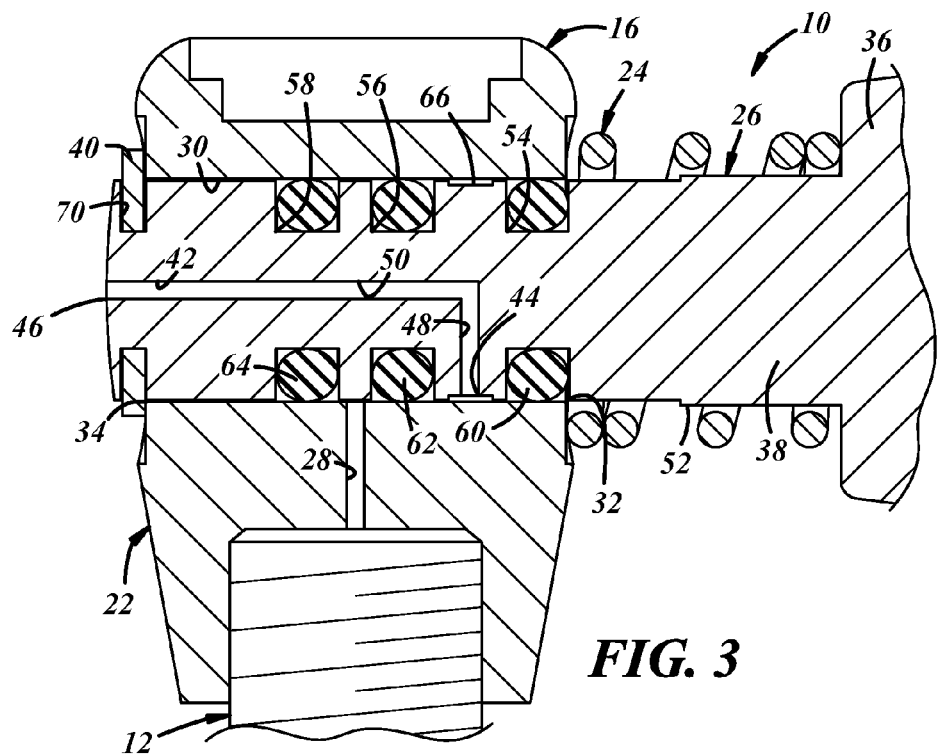
FIG. 3 is a sectional view of the animal behavioral control apparatus of FIG. 1, showing the animal behavioral control apparatus in a closed state.
Figure 4:
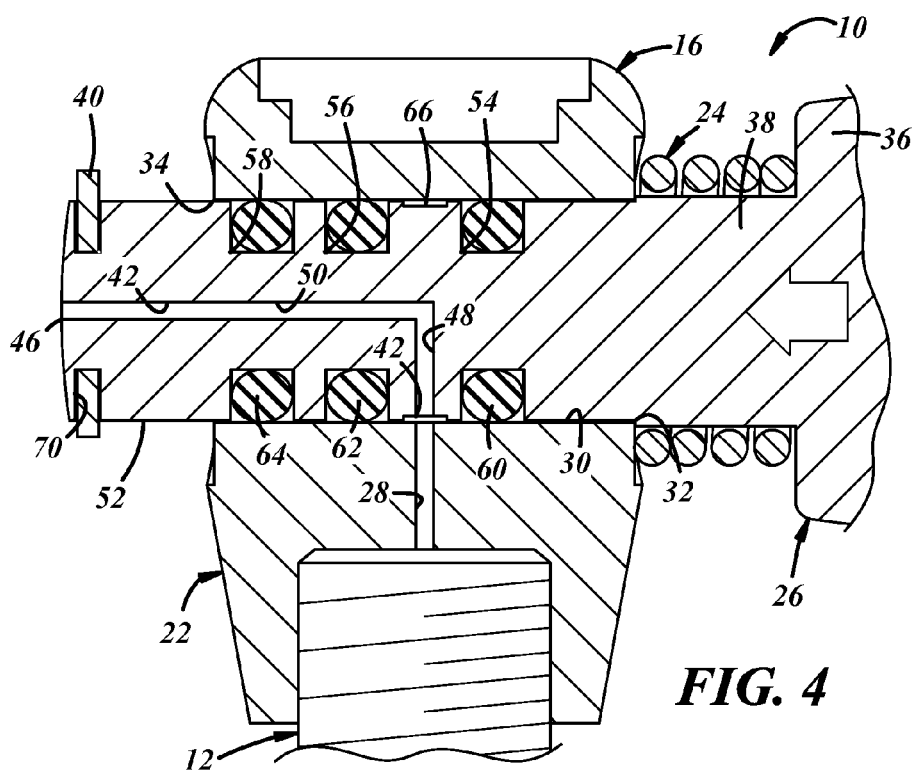
FIG. 4 is a sectional view similar to that of FIG. 3, but with the animal behavioral control apparatus in an open state.

Referring particularly to FIG. 2, the body 22 can be directly coupled to the cartridge 12 via threading, press-fitting, or another way. At the coupled end, the body 22 may have a pin projecting from the body that pierces a ball check valve, for example, of the cartridge 12. In this example, once they are coupled, the cartridge's valve may remain pierced and open in order to release pressurized gas out of the cartridge 12 or to at least be open to the coupled body. Referring now to FIGS. 3 and 4, the body 22 has a first passage 28 communicating with the opened cartridge 12 to receive the released gas. The first passage 28 spans vertically upward from the cartridge 12 and to a bore 30 of the body 22 where the first passage communicates with the bore when the actuator 26 is not inserted in the bore. The bore 30 extends completely through the body 22 from a first open end 32 and to a second open end 34, and extends transversely relative to the first passage 28. The bore 30 maintains a constant diameter from its first open end 32 to its second open end 34, though need not. Both the first passage 28 and the bore 30 have a cylindrical shape in this embodiment.

In this embodiment, the spring 24 is assembled between the body 22 and the actuator 26 in order to bias the animal behavioral control apparatus 10 in a first or closed state in which a blast of gas is not ejected. The spring 24 can be of different types including the coil spring shown in the figures that, when compressed inwardly on itself, exerts an opposite outwardly biasing force. In assembly in this embodiment, the spring 24 bears directly against the body 22 and the actuator 26 and biases them away from each other, and its helical body is seated over and around the actuator outside of and exterior to the bore 30. The spring 24 can have a spring-rating that would be suitably overcome by a typical user's thumb press force.

The actuator 26 can be actuated by the user to cause the animal behavioral control apparatus 10 to eject a blast of gas. Referring to FIGS. 2-4, in this embodiment actuation and de-actuation is performed via linear back-and-forth reciprocation of the actuator 26 through the bore 30 of the body 22, but could be performed via other motions and movements in other embodiments. Furthermore, the actuator 26 can include an assembly of components that work together to provide the actuating and de-actuating function. In the embodiment of the figures, for example, the actuator 26 in a sense acts as a plug and has a knob 36, a stem 38, several seals, and a clip 40. The knob 36 serves as a trigger which the user directly presses upon for actuation. The knob 36 may have a solid cylindrical shape. The stem 38 extends unitarily from the knob 36 and is cylindrically-shaped and diametrically-reduced compared to the knob. The stem 38 has a lengthwise axial extent that is greater than that of the bore 30 so that the stem can project completely through the bore when the two are assembled together as depicted in FIGS. 3 and 4.

A second passage 42 spans through the inside of the stem 38. From an inlet orifice 44 to an outlet orifice 46, the second passage 42 has an L-shape extent with a radial section 48 continuing on and leading to an axial section 50 ("radial" and "axial" used here in reference to the cylindrical shape of the stem 38). In one specific example, the outlet orifice 46 has a diameter of approximately 0.030 inches, but could have other diameter values in other examples. Similarly, the second passage 42 can have a constant and uniform diameter throughout its entire extent of approximately 0.030 inches, or of other diameter values. Or the second passage 42 could have sections of different diameter values—for example, the axial section 50 could have a larger diameter than the outlet orifice 46. These dimensions may be adjusted to alter a sound emitted when the blast of gas is ejected. The sound may be in addition to the blast physically felt, and the sound can be a high-pitched sound objectionable to the animal. The sound need not be emitted in all embodiments.

On an outer surface 52, the stem 38 has a first groove 54, a second groove 56, and a third groove 58. The stem 38 could have more or less than three grooves in other embodiments. The first, second, and third grooves 54, 56, 58 are axially spaced apart relative to one another, and are sized to receive seating of a respective o-ring seal. The second groove 56 is located downstream the first groove 54 with respect to the direction of gas flow through the axial section 50. Each groove is defined completely circumferentially around the stem 38. Between the first and second grooves 54, 56, another groove can be defined in the outer surface 52, or a channel can be defined when the stem 38 is inserted into the bore 30 via o-ring seals seated in the first and second grooves and via an inner surface of the bore, as is subsequently described. In either case, the inlet orifice 44 and radial section 48 are located axially between the first and second grooves 54, 56 (again here, "axially" is with reference to the cylindrical shape of the stem 38). The outer surface 52 between the second and third grooves 56, 58, on the other hand, has no communication with the second passage 42.

In this embodiment, a first o-ring seal 60 is seated in the first groove 54, a second o-ring seal 62 is seated in the second groove 56, and a third o-ring seal 64 is seated in the third groove 58. The o-ring seals 60, 62, 64 bear directly against and form air-tight seals with the inner surface of the bore 30 when the body 22 and the actuator 26 are assembled together. Referring now particularly to FIGS. 3 and 4, a first channel 66 is defined between the first o-ring seal 60, the second o-ring seal 62, the outer surface 52, and the inner surface of the bore 30; and a second channel (not shown) may be defined between the second o-ring seal 62, the third o-ring seal 64, the outer surface 52, and an inner surface of the bore 30. The first channel 66 extends circumferentially around the stem 38, and is therefore annular in shape. The first channel 66 communicates directly with, and is open to, the inlet orifice 44 of the second passage 42; while the second channel, if provided, may not communicate with the second passage's inlet orifice and is instead closed-off from the inlet orifice via the second o-ring seal 62. In the embodiment of the figures, an unchanneled portion is located axially between the second and third o-ring seals 62, 64.

In this embodiment, the clip 40 holds the actuator 26 and the body 22 together against the bias of the spring 24. In a sense, the clip 40 serves as a detent to prevent the stem 38 from being thrown out of the bore 30 by the force of the spring 24. Particularly, the clip 40 engages an end of the stem 38 that projects out of the bore 30 on a side of the bore opposite the spring 24. The clip 40 is a C-clamp that is inserted into a slot 70 defined in the stem 38, but the clip could be other types and could engage the actuator 26 in different ways.

In use, the animal behavioral control apparatus 10 is biased to the first state (FIG. 3) when it is at rest and the actuator 26 is not being actuated by the user. In the first state, the first passage 28 of the body 22 is in-line with the unchanneled portion where gas from the cartridge 12 is trapped or otherwise does not flow between the second and third o-ring seals 62, 64. The gas is therefore precluded from reaching the second passage 42 and a blast of gas is not ejected and a sound is not emitted. In another embodiment, the outer surface 52 simply plugs the first passage 28 and precludes gas flow; still, in yet another embodiment, another seal configuration could include a non-o-ring block seal that simply overlies the first passage and prevents gas flow from exiting the first passage when it is in the first state.

From the first state, a user can actuate the actuator 26 to bring the animal behavioral control apparatus 10 to a second or open state (FIG. 4) and eject a blast of gas out of the control apparatus. The user can exert a pressing force against the knob 36 and against the bias of the spring 24 to move and slide the stem 38 through the bore 30. In the second state, the first passage 28 of the body 22 is in-line with and open to the first channel 66 where gas from the cartridge 12 can flow into the first channel. From there, the gas can flow freely through the inlet orifice 44, through the second passage 42, and out the outlet orifice 46. Once the actuator 26 is released by the user, the animal behavioral control apparatus 10 goes back to the first state.

While the forms of the disclosure described constitute presently preferred embodiments, many others are possible. It is not intended herein to mention all the possible equivalent forms or ramifications of the disclosure. It is understood that the terms used herein are merely descriptive, rather than limiting, and that various changes may be made without departing from the spirit or scope of the invention.

The invention claimed is:

1. An animal behavioral control apparatus, comprising:
a cartridge containing pressurized gas; and
a head coupled to the cartridge, the head including a body and an actuator, the body having a first passage communicable with the pressurized gas in the cartridge and having a bore, the actuator extending through the bore of the body and having a second passage, the actuator having a seal, the seal comprising a first o-ring seal located upstream of an inlet of the second passage and the seal comprising a second o-ring seal located downstream of the inlet of the second passage;
wherein, when the animal behavioral control apparatus is in a first state, the first passage and the second passage are not in communication with each other and gas does not flow through the second passage, the seal precluding communication between the first passage and the second passage when the animal behavioral control apparatus is in the first state, and upon actuation of the actuator, the animal behavioral control apparatus is brought to a second state in which the first passage and the second passage are in communication with each other and gas flows through the second passage.

2. The animal behavioral control apparatus of claim 1, wherein the actuator has a channel communicating with the second passage, and upon actuation of the actuator, the animal behavioral control apparatus is brought to the second state in which the first passage and the channel are in communication with each other and gas flows through the second passage.

3. The animal behavioral control apparatus of claim 1, wherein the seal comprises a third o-ring seal located downstream of the second o-ring seal.

4. The animal behavioral control apparatus of claim 3, wherein, when the animal behavioral control apparatus is in the first state, the first passage is aligned between the second and third o-ring seals and gas does not flow through the second passage, and when the animal behavioral control apparatus is brought to the second state, the first passage is aligned between the first and second o-ring seal and gas flows through the second passage.

5. The animal behavioral control apparatus of claim 4, wherein the actuator has a first groove, a second groove, and a third groove, and the first o-ring seal is seated in the first groove, the second o-ring seal is seated in the second groove, and the third o-ring seal is seated in the third groove.

6. The animal behavioral control apparatus of claim 5, wherein the actuator has a channel defined between the first groove and the second groove, the channel communicating directly with the second passage, the actuator has an unchanneled portion located between the second groove and the third groove, and, when the animal behavioral control apparatus is in the first state, the unchanneled portion is in-line with the first passage, and, when the animal behavioral control apparatus is in the second state, the channel is in-line with the first passage.

7. The animal behavioral control apparatus of claim 4, wherein upon actuation of the actuator, the actuator moves linearly through the bore.

8. The animal behavioral control apparatus of claim 1, further comprising a cover surrounding at least a portion of the cartridge.

9. The animal behavioral control apparatus of claim 1, wherein the head includes a spring biasing the actuator so that the animal behavioral control apparatus remains in the first state until the actuator is actuated.

10. The animal behavioral control apparatus of claim 9, wherein the spring is seated around the actuator outside of the bore.

11. The animal behavioral control apparatus of claim 9, wherein the actuator has a clip that holds the actuator and body together against the bias of the spring.

12. The animal behavioral control apparatus of claim 1, wherein the second passage has a radial section and an axial section communicating with each other, the radial section communicating directly with the first passage and having an inlet orifice of the second passage, and the axial section having an outlet orifice of the second passage.

13. An animal behavioral control apparatus, comprising:
a cartridge containing pressurized gas; and
a head coupled to the cartridge, the head including a body, a spring, and an actuator, the body having a first passage communicable with the pressurized gas and having a bore, the spring making contact with the body and with the actuator and biasing the actuator away from the body, the actuator received in the bore and having a second passage, the actuator having a first groove with a first o-ring seal seated in the first groove, the actuator having a second groove with a second o-ring seal seated in the second groove, the first and second grooves and first and second o-ring seals located in the bore when the actuator is received in the bore, the first o-ring seal located on one side of an inlet of the second passage and the second o-ring seal located on another side of the inlet of the second passage;
wherein, when the animal behavioral control apparatus is in a first state, the first passage and the second passage are not in communication with each other and gas does not flow through the second passage, the spring biasing the animal behavioral control apparatus to the first state, and, when the animal behavioral control apparatus is in a second state upon actuation of the actuator, the first passage and the second passage are in communication with each other and gas flows through the second passage.

* * * * *